US012545554B2

(12) United States Patent
Jinno et al.

(10) Patent No.: US 12,545,554 B2
(45) Date of Patent: Feb. 10, 2026

(54) ELEVATOR SYSTEM

(71) Applicant: HONDA MOTOR CO., LTD., Tokyo (JP)

(72) Inventors: Tatsuya Jinno, Wako (JP); Takumi Shiiyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 814 days.

(21) Appl. No.: 17/948,353

(22) Filed: Sep. 20, 2022

(65) Prior Publication Data

US 2023/0019416 A1 Jan. 19, 2023

Related U.S. Application Data

(63) Continuation of application No. PCT/JP2021/003857, filed on Feb. 3, 2021.

(30) Foreign Application Priority Data

Mar. 27, 2020 (JP) ................................ 2020-057897

(51) Int. Cl.
*B66B 11/04* (2006.01)
*B66B 1/30* (2006.01)
*B66B 11/00* (2006.01)

(52) U.S. Cl.
CPC .............. *B66B 11/043* (2013.01); *B66B 1/30* (2013.01); *B66B 11/004* (2013.01); *B66B 11/0015* (2013.01)

(58) Field of Classification Search
CPC ..... B66B 11/004; B66B 11/0015; B66B 1/30; B66B 11/043; B66B 1/28
USPC .......................................................... 187/290
See application file for complete search history.

(56) References Cited

U.S. PATENT DOCUMENTS 11,155,439 B2 * 10/2021 Ratia ..................... B66B 1/2466
11,383,957 B2 * 7/2022 Kattainen ............... B66B 5/027
2020/0346889 A1 * 11/2020 Glessner ............... H02M 7/003

FOREIGN PATENT DOCUMENTS

JP H11-322217 A 11/1999
JP 2012-197166 A 10/2012
JP 2013-052990 A 3/2013
JP 2013-136445 A 7/2013
JP 6576588 B1 9/2019
JP 2020-047397 A 3/2020
(Continued)

OTHER PUBLICATIONS

Takao et al. (WO 2020016925 A1), Elevator System (Year: 2020).*
(Continued)

*Primary Examiner* — Jorge L Carrasquillo
(74) *Attorney, Agent, or Firm* — WHDA, LLP

(57) ABSTRACT

An elevator system provided in an existing apartment building, includes a motor that is a drive source for a lifting mechanism of an elevator car, a power storage device configured to store power supplied to the motor, and a charger configured to charge the power storage device with power supplied from a power grid. A traveling motor, an in-vehicle power storage device, and an in-vehicle charger of a used vehicle are diverted to the motor, the power storage device and the charger. The power storage device is used as a normal power supply of the elevator system. The motor is driven by power supplied from not the power grid but the power storage device.

6 Claims, 2 Drawing Sheets

(56) References Cited

FOREIGN PATENT DOCUMENTS

| | | | |
|---|---|---|---|
| WO | 2007/108082 | A1 | 9/2007 |
| WO | 2012/172589 | A1 | 12/2012 |

OTHER PUBLICATIONS

Matsuoka et al. (JP 2002348055 A)User Guide Device of Elevator (Year: 2002).*
Ochi et al. (JP 2013136445 A) Elevator System (Year: 2013).*
International Preliminary Report on Patentability Chapter II (PCT/IPEA/409) issued in counterpart International Application No. PCT/JP2021/003857 mailed Oct. 21, 2022, with English Translation and form PCT/IPEA/416. (12 pages).
International Search Report dated Apr. 6, 2021, issued in parent application PCT/JP2021/003857 (English translation).
PCT/ISA/237 Written Opinion of the International Searching Authority dated Apr. 6, 2021, issued in parent application PCT/JP2021/003857.
PCT/IPEA/408 Written Opinion of the International Preliminary Examining Authority dated Nov. 22, 2021, issued in parent application PCT/JP2021/003857.

* cited by examiner

ELEVATOR SYSTEM

CROSS-REFERENCE TO RELATED APPLICATION(S)

This application is a Continuation of International Patent Application No. PCT/JP2021/003857, filed Feb. 3, 2021, which claims the benefit of Japanese Patent Application No. 2020-057897, filed Mar. 27, 2020, both of which are hereby incorporated by reference herein in their entirety.

BACKGROUND OF THE INVENTION

Field of the Invention

The present invention relates to an elevator system.

Description of the Related Art

Elevators are widely used in modern buildings (Japanese Patent Application Laid-Open No. 2013-136445 and Japanese Patent No. 6576588). However, some old apartment buildings are not provided with elevators. For example, Low-rise apartment buildings in a housing complex that are only five stories tall, typically do not include elevators.

With today's aging society, elevator installation is required for existing buildings for accessibility. However, even if there is a space for installing an elevator in such an old building, the building often does not have sufficient power supply capacity. Elevator installation has been slow due to the increased construction cost due to the large-scale power supply construction requirement.

SUMMARY OF THE INVENTION

An object of the present invention is to provide an elevator system that can be constructed at a relatively lower cost and that does not require large-scale power supply construction.

According to an aspect of the present invention, there is provided an elevator system provided in an existing apartment building, comprising: a motor that is a drive source for a lifting mechanism of an elevator car; a power storage device configured to store power supplied to the motor; and a charger configured to charge the power storage device with power supplied from a power grid, wherein a traveling motor, an in-vehicle power storage device, and an in-vehicle charger of a used vehicle are diverted to the motor, the power storage device and the charger, the power storage device is used as a normal power supply of the elevator system, and the motor is driven by power supplied from not the power grid but the power storage device.

Further features of the present invention will become apparent from the following description of exemplary embodiments (with reference to the attached drawings).

DESCRIPTION OF THE EMBODIMENTS

Figure 1:
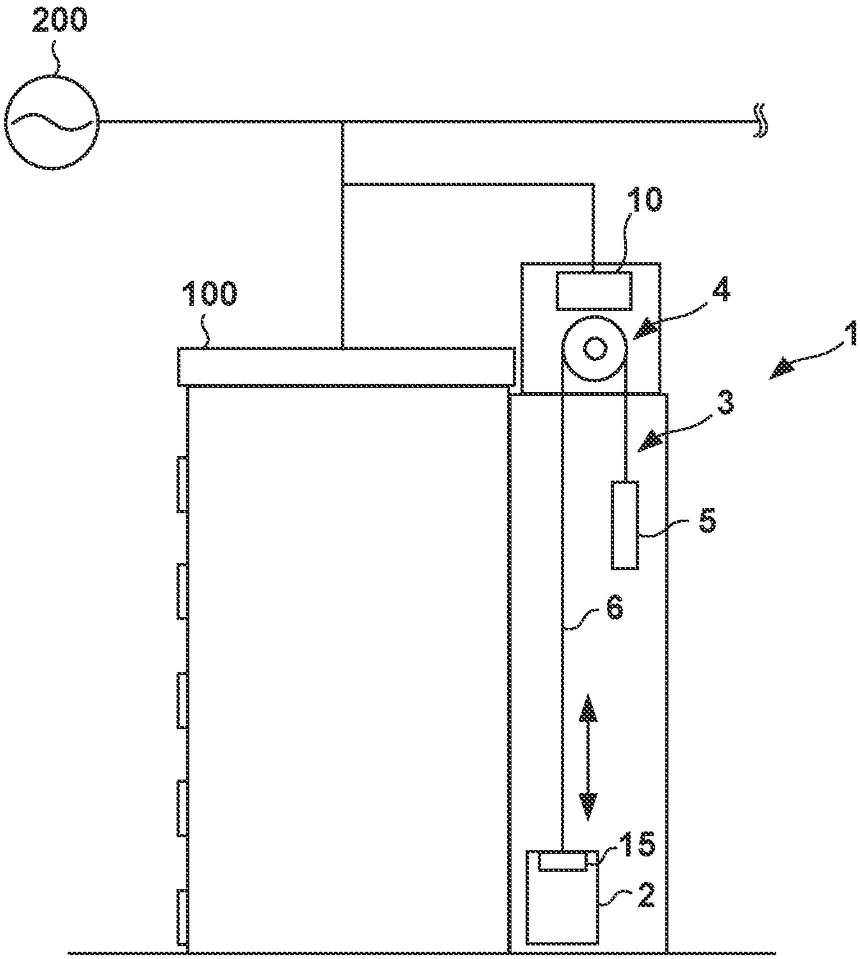
FIG. 1 is a configuration diagram illustrating an elevator system according to one embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Configuration of Elevator System>

FIG. 1 is a configuration diagram illustrating an elevator system 1 according to one embodiment of the present invention. The elevator system 1 is added to an apartment building 100 which is an existing building. The apartment building 100 is a low-rise building, for example, that is only five stories tall. The apartment building 100 is supplied with power from a power grid 200. The power grid 200 is a power station operated by, for example, an energy supplier and supplies AC power. The power supplied to the apartment building 100 is low-voltage electric power. The elevator system 1 is driven by the power currently supplied to the apartment building 100. Therefore, large-scale power supply construction is not required.

The elevator system 1 includes an elevator car 2, a lifting mechanism 3 that raises and lowers the elevator car 2, and a control device 10. The elevator car 2 is provided with an air conditioner 15, which cools or warms the inside of the elevator car 2. The lifting mechanism 3 includes a weight 5 connected to the elevator car 2 via a rope 6; and a hoist 4 around which the rope 6 is wound. The elevator car 2 is raised and lowered by driving of the hoist 4. The control device 10 controls the elevator system 1.

<Control Device>

Figure 2:
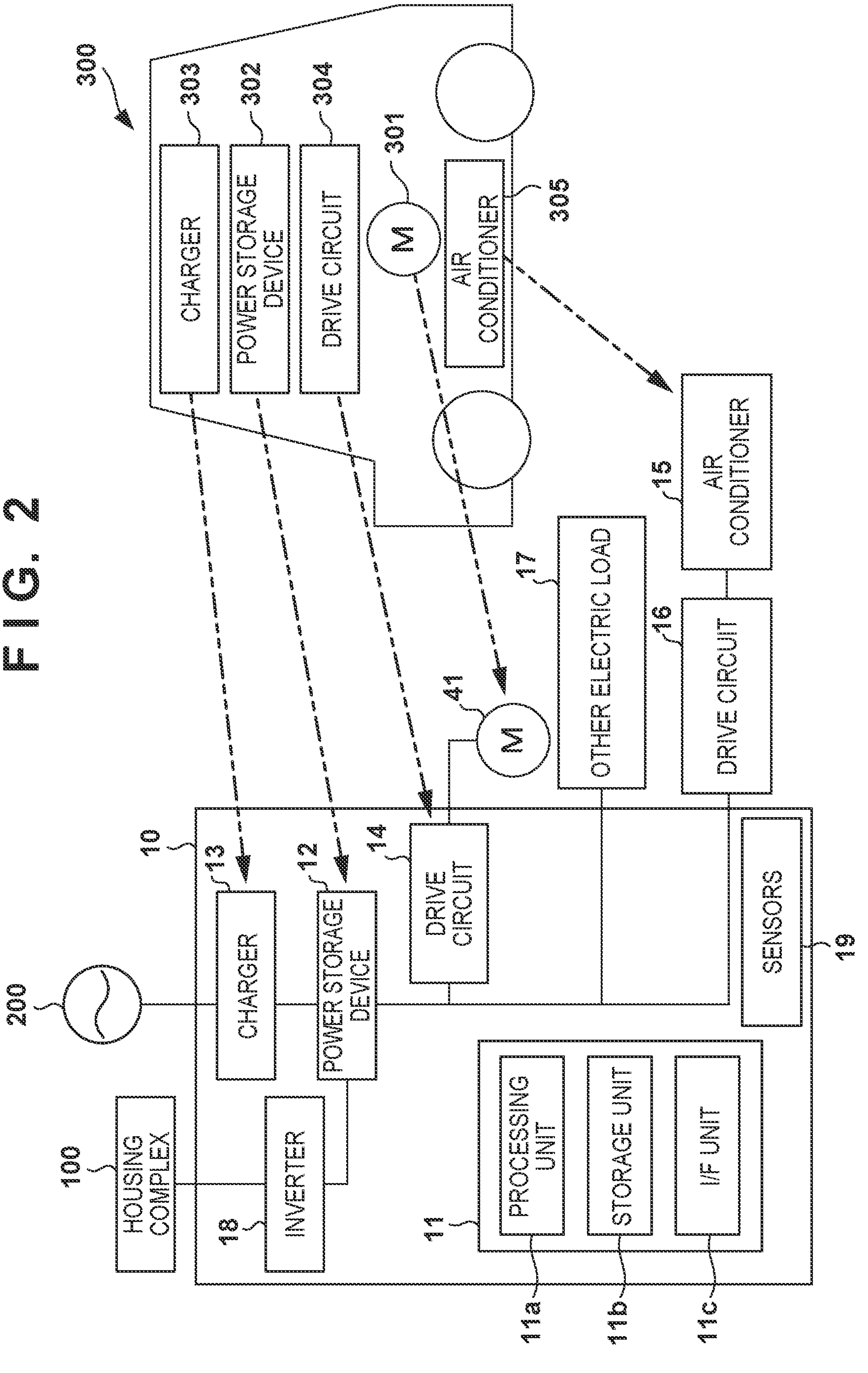
FIG. 2 consists of a block diagram of the elevator system shown in FIG. 1 and a diagram illustrating how components are brought from a used vehicle.

FIG. 2 consists of a block diagram of the elevator system 1 and a diagram illustrating how components are brought from a used vehicle 300. A solid line connecting blocks indicates a power line. The control device 10 includes a control unit 11, a charger 13, a power storage device 12, a drive circuit 14, an inverter 18, and a group of sensors 19.

The drive circuit 14 drives a motor 41 which is a drive source of the hoist 4. The power storage device 12 stores power to be supplied to the motor 41. The charger 13 charges the power storage device 12 with power supplied from the power grid 200. In the present embodiment, drive power of the motor 41 is supplied from the power storage device 12 to the motor 41 via the drive circuit 14; it is not directly supplied from the power grid 200 to the motor 41 via the drive circuit 14. That is, the power storage device 12 functions as a normal power supply of the elevator system 1.

The power stored in the power storage device 12 is also supplied to the air conditioner 15 and the other electric load 17 of the elevator system 1 via a drive circuit 16. The other electric load 17 is, for example, a motor for opening and closing a door, a lighting fixture or a display, which is provided in the elevator car 2. The power stored in the power storage device 12 is also supplied to the apartment building 100 via the inverter 18 in an emergency such as power failure. The power storage device 12 is also used as an emergency power supply for the apartment building 100.

The sensors 19 includes, for example, a sensor that detects a position of the elevator car 2 within a hoistway; a sensor that detects whether the door of the elevator car 2 is opened or closed; a sensor that detects a temperature in the elevator car 2; a sensor that detects whether there is a passenger/passengers in the elevator car 2; a sensor that detects whether a passenger operates a hall call button on each floor; a sensor that detects a power failure of the power grid 200;

and a sensor (e.g. a current/voltage sensor) that detects a charge/discharge amount of the power storage device 12.

The control unit 11 is an electric circuit that controls the entire elevator system 1. The control unit 11 controls the charger 13, the motor 41 via the drive circuit 14, the other electric load 17, the air conditioner 15 via the drive circuit 16, and the inverter 18 on the basis of the detection results of the sensor group 19.

The control unit 11 includes a processing unit 11*a*, a storage unit 11*b*, and an interface (I/F) unit 11*c*. The processing unit 11*a* is a processor represented by a CPU, and executes a program stored in the storage unit 11*b*. The storage unit 11*b* is a storage device such as a RAM, a ROM or a hard disk, which stores a program executed by the processing unit 11*a* as well as various data. The interface unit 11*c* is an interface which relays transmission and reception of signals between an external device and the processing unit 11*a*. The interface unit 11*c* can include an input/output interface and a communication interface.

A traveling motor 301, an in-vehicle drive circuit 304, an in-vehicle power storage device 302, an in-vehicle charger 303, and an in-vehicle air conditioner 305 of the used vehicle 300 are diverted to the motor 41, the drive circuit 14, the power storage device 12, the charger 13 and the air conditioner 15. The used vehicle 300 is an electric vehicle, but may be a hybrid vehicle. The in-vehicle components may be brought from a different used vehicle 300.

The in-vehicle power storage device 302 is a power storage device that supplies power to the traveling motor 301 of the used vehicle 300, and is a large-capacity battery such as a lithium ion battery. Such an in-vehicle power storage device 302 is replaced when it does not satisfy requirements for in-vehicle components; however, it may merely not meet in-vehicle criteria and may have still sufficient performance as a power storage device for other applications. Therefore, effective resource utilization can be ensured by using the in-vehicle power storage device 302 as the power storage device 12. A plurality of power storage devices 12 may be provided according to a size of the elevator system 1.

The in-vehicle charger 303 includes a converter, and is, for example, a normal charger built in the used vehicle 300 that normally charges the power storage device 302 by power supplied from a charging station when a charging gun of the charging station is connected to the used vehicle 300. Since the in-vehicle charger 303 can charge the power storage device 302 by low-voltage power received from the power grid 200, it can be used as the charger 13 without extra work, and thus large-scale power supply construction is not required.

The in-vehicle drive circuit 304 is an electric circuit that supplies power of the in-vehicle power storage device 302 to the traveling motor 301 to drive the traveling motor 301. The traveling motor 301 is, for example, an AC motor, and the in-vehicle drive circuit 304 includes an inverter. The in-vehicle drive circuit 304 also includes a circuit that recovers regenerative power from the traveling motor 301.

The traveling motor 301 for an electric vehicle has an output sufficient to carry occupants, and has performance needed for to be used as the motor 41 for raising and lowering the elevator car 2. The elevator car 2 is raised and lowered by forward and reverse rotation and rotation speed control of the motor 41, which fall within a scope of a control logic of the traveling motor 301 for a vehicle. Therefore, the in-vehicle drive circuit 304 can be used as the drive circuit 14 without extra work, and furthermore, it is possible to charge the power storage device 12 by applying power generation control adopted for regenerative braking of a vehicle when the elevator car 2 is lowered. The drive circuit 304 of the used vehicle 300 can also be used as the inverter 18.

The in-vehicle air conditioner 305 is able to cool or warm a passenger compartment of a vehicle, and thus can be used to cool or warm inside the elevator car 2 since it has an area equal to or slightly wider than the passenger compartment. Therefore, the in-vehicle air conditioner 305 can be generally used as the air conditioner 15 without extra work. An ECU of the used vehicle 300 that controls the in-vehicle air conditioner 305 can be diverted to the drive circuit 16.

By reusing the components of the used vehicle 300, the elevator system 1 can be constructed at a lower cost. Since each component has been successfully used in the used vehicle 300, the elevator system 1 can be built up saving time and effort. A four-wheeled vehicle is assumed as the used vehicle 300 in the present embodiment; however, a traveling motor, a power storage device, and a drive circuit of a two-wheeled electric vehicle can also be used according to a size of the elevator system 1.

<Exemplified Control>

An exemplified control of the control unit 11 will be described hereinbelow. As described above, the power storage device 12 is used as a normal power supply of the elevator system 1 in the present embodiment. That is, the control unit 11 drives the motor 41 by power supplied from the power storage device 12 whether it is in a normal or emergency situation. Since the in-vehicle charger 303 is diverted to the charger 13, it is not substantially necessary to newly prepare a power supply circuit that receives power from the power grid 200.

Since standard charge is applied to the power storage device 12 when it is charged by the charger 13, it takes time for full charging, but it is expected that the elevator system 1 is rarely used at night. It is also expected that the elevator system 1 is not quite often used even in the daytime since the apartment building 100 is a low-rise building in which the number of residents is relatively small. The control unit 11 can avoid a situation in which a state of charge (SOC) of the power storage device 12 is low by charging the power storage device 12 with the charger 13 during night or an unused time zone in the daytime in which the elevator system 1 is not used. If too low SOC is expected for the power storage device 12 in actual operation of the elevator system 1, the number of the power storage devices 12 can be increased.

When power failure occurs in the power grid 200, the control unit 11 operates the inverter 18 to supply power stored in the power storage device 12 to electric loads of the apartment building 100. The power storage device 12 can be also used as an emergency power supply of the apartment building 100, not only as a normal power of the elevator system 1.

Summary of Embodiments

The embodiment stated above discloses at least the following power control system.

1. An elevator system (1) in the embodiment, comprising:
  - a motor (41) that is a drive source for a lifting mechanism (3) of an elevator car (2);
  - a power storage device (12) configured to store power supplied to the motor (41); and
  - a charger (13) configured to charge the power storage device (12) with power supplied from a power grid (200), wherein a traveling motor (301), an in-vehicle power storage device (302), and an in-vehicle charger (303) of a used vehicle (300) are diverted to the motor (41), the power storage device (12) and the charger (13).

According to the present embodiment, it is possible to provide an elevator system that can be constructed at a relatively lower cost but that does not require large-scale power supply construction.

2. In the embodiment, an air conditioner (15) configured to air-condition inside the elevator car is provided, and an in-vehicle air conditioner (305) of a used vehicle is diverted to the air conditioner (15).

According to the present embodiment, it is possible to provide the elevator car with air-conditioning function at a relatively lower cost.

3. In the embodiment, the motor (41) is driven by power supplied from the power storage device (12) whether it is in a normal or emergency situation.

According to the present embodiment, it is not substantially required to build extra substations for the power grid.

4. In the embodiment, a drive circuit (14) configured to drive the motor (41) is provided, and an in-vehicle drive circuit (304), of a used vehicle (300), configured to drive the traveling motor (301) is diverted to the drive circuit (14).

According to the present embodiment, the drive circuit can be built up at a relatively lower cost, and a control algorithm for a vehicle can be adopted without extra work.

5. In the embodiment, the elevator system (1) is provided in an existing apartment building (100).

According to the present embodiment, the elevator system can be easily introduced into the existing apartment building.

6. In the embodiment, a supply unit configured to supply power of the power storage device to an electric load of the apartment building is provided.

According to the present embodiment, the power storage device can be used as an emergency power supply for the apartment building.

While an embodiment has been describe, the invention is not limited to the foregoing embodiments, and various variations/changes are possible within the spirit of the invention.

What is claimed is:

1. An elevator system provided in an existing apartment building, comprising:

a motor that is a drive source for a lifting mechanism of an elevator car;

a power storage device configured to store power supplied to the motor; and a charger configured to charge the power storage device with power supplied from a power grid, wherein a traveling motor, an in-vehicle power storage device, and an in-vehicle charger of a used vehicle are diverted to the motor, the power storage device and the charger of the elevator system, the in-vehicle power storage device is used as a power supply of the elevator system in case of an emergency of a power failure, and the motor is driven by power supplied from not the power grid but the in-vehicle power storage device.

2. The elevator system according to claim 1, further comprising:

an air conditioner configured to air-condition inside the elevator car, wherein an in-vehicle air conditioner of a used vehicle is diverted to the air conditioner.

3. The elevator system according to claim 1, wherein the motor is driven by power supplied from the in-vehicle power storage device whether it is in a normal or emergency situation.

4. The elevator system according to claim 1, further comprising:

a drive circuit configured to drive the motor, wherein an in-vehicle drive circuit, of the used vehicle, configured to drive the traveling motor is diverted to the drive circuit.

5. The elevator system according to claim 1, further comprising:

a supply unit configured to supply power of the power storage device to an electric load of the apartment building.

6. The elevator system according to claim 1, wherein the power storage device is charged with the charger in a predetermined unused time zone of the elevator.

* * * * *